(12) United States Patent
Hoejen-Soerensen (10) Patent No.: US 7,991,059 B2
(45) Date of Patent: Aug. 2, 2011

(54) ROBUST CHANNEL ESTIMATION FOR WIRELESS SYSTEMS

(75) Inventor: Pedro Hoejen-Soerensen, Allerod (DK)

(73) Assignee: Nokia Corporation, Espoo (FI)

( * ) Notice: Subject to any disclaimer, the term of this patent is extended or adjusted under 35 U.S.C. 154(b) by 902 days.

(21) Appl. No.: 11/978,668

(22) Filed: Oct. 30, 2007

(65) Prior Publication Data

US 2009/0016455 A1    Jan. 15, 2009

(30) Foreign Application Priority Data

Jul. 9, 2007    (EP) .................................... 07013404

(51) Int. Cl.
*H04L 27/28* (2006.01)
(52) U.S. Cl. ...................................... 375/260; 375/340
(58) Field of Classification Search ................. 375/260, 375/340, 343, 349 E1.032; 370/208, 203
See application file for complete search history.

(56) References Cited

U.S. PATENT DOCUMENTS

| | | | | |
|---|---|---|---|---|
| 2003/0086371 | A1* | 5/2003 | Walton et al. ................. | 370/235 |
| 2006/0239178 | A1* | 10/2006 | Svensson et al. ............. | 370/208 |
| 2007/0110172 | A1* | 5/2007 | Faulkner et al. .............. | 375/260 |
| 2009/0041095 | A1* | 2/2009 | Lee et al. ...................... | 375/149 |

OTHER PUBLICATIONS

Mobile Channel Characteristics, Chapter 5, Second Order Statistics of Fading, The Kluwer International Series in Engineering and Computer Science, 2002.*

C.R.N. Athaudage and A.D.S. Jayalath, "A Novel RMS Delay-Spread Estimation Technique for Wireless OFDM Systems", Ultra-Broadband Information Networks and Australian National University, 2003 IEEE.*

Athanasios Doukas and Grigorios Kalivas, "A Novel Blind Trms Estimation Method for Wireless OFDM Systems",Department of Electrical and Computer Engineering, University of Patras, Patra, Greece, Feb. 2006.*

Tevfik Yucek and Huseyin Arslan, Delay Spread and Time Dispersion Estimation for Adaptive OFDM Systems, Department of Electrical Engineering, University of South Florida, 2006 IEEE.*

Athanasios Doukas, et al.; "A Novel Blind Delay Spread Estimation Using Frequency Correlation For Wireless OFDM Systems"; pp. 1-4, Sep. 2006.

Hüseyin Arslan, et al.; "Delay Spread Estimation for Wireless Communciation Systems"; IEEE 2003; pp. 1-6.

Office Action issued Mar. 22, 2011 for corresponding Korean patent application No. 10-2010-7002580, with English translation.

* cited by examiner

*Primary Examiner* — Chieh M Fan
*Assistant Examiner* — Aristocratis Fotakis
(74) *Attorney, Agent, or Firm* — Squire, Sanders & Dempsey (US) LLP (57) ABSTRACT

The present invention relates to a method, apparatus, and computer program product, wherein frequency co-variances or correlations of a measured power delay profile or frequency correlation function are estimated at two different non-zero sub-carrier lags of an orthogonal frequency division multiplexing channel. A ratio of squared magnitudes of the two estimated frequency co-variances is calculated and a delay spread or coherence bandwidth of said channel is estimated based on the calculated ratio.

23 Claims, 6 Drawing Sheets

ROBUST CHANNEL ESTIMATION FOR WIRELESS SYSTEMS

FIELD OF THE INVENTION

The present invention relates to a method, apparatus, and computer program product for performing channel estimation in a transmission system, such as an OFDM (Orthogonal Frequency Division Multiplexing) based transceiver system (e.g. wireless local area network (WLAN), Worldwide Interoperability for Microwave Access (WiMAX), and 3.9G/Long Term Evolution (LTE)).

BACKGROUND OF THE INVENTION

In OFDM systems, efficient channel estimation schemes are essential for coherent detection of a received signal. After multi-carrier demodulation, the received signal is typically correlated in two dimensions, in time and frequency. The coherence bandwidth is a measure of how rapidly a channel transfer function varies across frequencies. The ability to estimate the coherence bandwidth (and signal-to-noise level) is a requirement for reliably estimating the channel transfer function (CTF), i.e., channel estimation. Also this information could be transmitted back to the base-station or access point radio resource scheduler. In addition, a timing of a first significant channel path (i.e., a propagation time from the transmitter to the receiver) can be estimated. Usually, this timing estimate is then applied in a receiver in a timing correction loop that makes sure that the correct part of a received signal is extracted for further processing.

The starting point for getting a measure of the coherence bandwidth is to evaluate a frequency correlation function based on noisy samples $(c_f)_f$ of the CTF, e.g., based on the following equation:

$$\hat{\rho}(l) = \frac{\frac{1}{N_n}\sum_f c_{f+l}c_f^*}{\frac{1}{N_d}\sum_f c_f c_f^*} \quad (1)$$

where $f$ denotes a sub-carrier index, and $N_n$ and $N_d$ denotes the number of terms in the summation used in the nominator and denominator, respectively. Ideally, the above equation could be solved based on a true (but unknown) value of the channel transfer function $h_{71}$. However, in practice only noisy estimates, i.e. $c_f = h_f + \epsilon_f$, are available, where $\epsilon_f$ denotes a noise contribution.

Now, assuming that the noise terms are uncorrelated this means that the estimated frequency correlation approaches $$\hat{\rho} = (l)\frac{\langle h_{f+l}h_f^*\rangle}{\langle h_f h_f^*\rangle + \sigma_\epsilon^2} = \frac{R(l)}{R(0) + \sigma_\epsilon^2} \quad (2)$$

where $\langle \cdot \rangle$ denotes an ensemble average and $\sigma_\epsilon^2$ denotes the noise variance. Here, $R(\cdot)$ denotes the frequency covariance. The ensemble average is defined as the mean of a quantity that is a function of the micro-state of a system (the ensemble of possible states), according to the distribution of the system on its micro-states in this ensemble. From equation (2) it can be derived that the presence of noise makes the normalization of the correlation function incorrect. Only in the case where there is no noise, i.e. $\sigma_\epsilon^2 = 0$, a correct value can be obtained.

Hence, there is an accuracy problem if the coherence bandwidth of the wireless channel and the signal-to-noise (SNR) level of the received signal are estimated based on noisy samples of the channel transfer function (CTF).

A direct way of estimating the timing is to assume a single path channel. In that case the frequency correlation function is $\rho(l)=\exp(-j2\pi dl)$, where d denote the delay of the single path. Hence, the delay can be estimated as $$\hat{d} = -\frac{1}{2\pi l}\angle\rho(l)$$

and $R(l)=\langle h_{f+l}h_f^*\rangle$ can be computed, since $\langle h_{f+l}h_f^*\rangle \propto \rho(l)$. Thus, the frequency correlation function has to be determined up to a (real valued) multiplicative constant. However, when such an estimator is applied on multi-path channels it is not the delay to the first significant path, which is estimated but rather the average delay of the channel impulse response.

SUMMARY

It is therefore an object of the present invention to provide a method and apparatus, by means of which a robust channel estimation with less sensitivity to noise and/or delay can be achieved.

This object is achieved by a method comprising:
 estimating frequency co-variances or correlations of a measured power delay profile or frequency correlation function at two different non-zero sub-carrier lags of an orthogonal frequency division multiplexing channel;
 calculating a function of the ratio of magnitudes of the two estimated frequency co-variances; and
 estimating based on said calculated function a delay spread or coherence bandwidth of said channel.

Furthermore, the above object is achieved by an apparatus comprising:
 a first estimation module for estimating frequency co-variances or correlations of a measured power delay profile or frequency correlation function at two different non-zero sub-carrier lags of an orthogonal frequency division multiplexing channel;
 a calculation module for calculating a function of the ratio of magnitudes of the two estimated frequency co-variances; and
 a second estimation module for estimating based on said calculated function a delay spread or coherence bandwidth of said channel.

Implementation of the proposed estimation may be based on a computer program comprising code means for producing the above method steps when run on a computer device. The computer program may be stored on a computer-readable medium or may be downloadable from a private or public network.

Accordingly, a more robust channel estimation can be achieved. An improved coherence bandwidth estimator is obtained, which as a spin-off can also provide an estimate of the signal-to-noise level or SNR. The estimates can be obtained prior to any advanced channel estimation procedure. Such estimates of the coherence bandwidth and the SNR can be used for advanced channel estimation which adapts to the channel conditions.

The estimated delay spread or coherence bandwidth can be used to estimate the magnitude of a noiseless frequency correlation at one of the two different subcarrier lags. Optionally, a signal-to-noise ratio could be determined by estimating a ratio between the magnitude of the noiseless frequency correlation at the one of the two different subcarrier lags and an estimated magnitude of the noiseless frequency correlation at the zero subcarrier lag.

Furthermore, one of the two subcarrier lags may be selected according to an operating point of interest.

The estimated delay spread or coherence bandwidth could be mapped into a timing estimate based on the location of a first significant tap. Thus, in addition, a timing estimator can be derived, which improves earlier/direct solutions by taking into account the delay introduced by the time-dispersion of the channel.

Additionally, as a further estimation, a phase angle of said frequency correlation function could be estimated and a phase angle part originating from a time dispersion of said channel could be subtracted in order to obtain a phase angle which can be mapped into an estimate of a delay which describes a time to a first path of said channel. Thereby, it is possible to estimate the delay of the first significant path instead of the average time delay.

As an example, the phase angle of the frequency correlation function is obtained from a naïve timing estimation.

The frequency correlations or co-variances can be estimated based on pilot channel estimates.

In addition, the frequency correlations or co-variances can be estimated also based on at least one previous frequency correlation or co-variance estimate.

Advanced channel estimators that make use of some parametric model of the power delay profile (PDP) are thus enabled to know the location of the first significant path. Also timing correction loops which make sure that the "correct" part of the received signal is picked out for further processing benefit from this improved timing estimate as it enables the receiver to operate in channels with larger delay spread.

Further advantageous modifications are defined in the dependent claims.

BRIEF DESCRIPTION OF THE DRAWINGS

In the following, the present invention will be described in greater detail based on embodiments with reference to the accompanying drawings, in which.

DESCRIPTION OF THE PREFERRED EMBODIMENT

An embodiment will now be described based on a channel estimation for an exponential PDP. The proposed channel estimation method or channel estimator can be applied in any receiver or transceiver arrangement or module provided in a terminal device or network device. It is applicable to both uplink and downlink transmissions. It should be noted that the described principles can also be applied to other PDPs (or equivalently parameterized frequency correlations functions) as well, suitable for estimating at least one of the coherence bandwidth, the signal-to-noise ratio (SNR) and the delay to the first significant path. Such information may be needed in order to set up other receiver components, e.g. select the most appropriate frequency processing for channel estimation. As shown below, when an exponential PDP is chosen it is possible to apply calculations in closed-form. In other cases, the proposed solution can however be used as well, if the model parameters are solved by numerical methods.

Under the above assumption that the PDP can be modeled as exponential, the frequency correlation function $\rho(f-f') = \rho(\Delta f) = \langle (h_f + \epsilon_f)(h_{f'} + \epsilon_{f'})^* \rangle$, where $h_f$ and $\epsilon_f$ denotes the complex low-pass equivalent channel and white noise process, respectively, is given by:

$$\rho(\Delta f) = \begin{cases} 1 + \dfrac{\sigma^2}{P_h} & \text{for } \Delta f = 0 \\ \dfrac{1 - j2\pi\Delta f \tau}{1 + (2\pi\Delta f \tau)^2} & \text{for } \Delta f \neq 0 \end{cases} \quad (3)$$

where $\sigma^2$ and $P_h$ denotes the noise variance of the measurement process and the variance of the CTF, respectively, and $\tau$ denotes the RMS (root mean square) delay-spread of the exponential PDP. For $\Delta f=0$ use can be made of the fact that the channel and noise process are independent and for $\Delta f \neq 0$ use can be made of the fact that $\epsilon$ is a white noise process. The squared magnitude of the measured frequency correlation function is then given by, $$|\rho(\Delta f)|^2 = \begin{cases} \left(1 + \dfrac{\sigma^2}{P_h}\right)^2 & \text{for } \Delta f = 0 \\ \dfrac{1}{1 + (2\pi\Delta f \tau)^2} & \text{for } \Delta f \neq 0 \end{cases} \quad (4)$$

The above equations (3) and (4) are based on the assumption that the frequency correlation function is given as the Fourier transform of the PDP, i.e. $R(t; f-f') = \int d\tau P(t;\tau) \exp(-j2\pi\tau(f-f'))$, where $P(t;\tau)$ denotes the PDP at time t. Hence, the frequency correlation function of a exponential $$PDP \dfrac{1}{\tau_{rms}} \exp(-\tau/\tau_{rms})$$

with RMS delay spread $\tau_{rms}$ is given by $$\dfrac{1 - j2\pi\Delta f \tau_{rms}}{1 + (2\pi\Delta f \tau_{rms})^2}.$$

The frequency covariance function $\hat{R}(\cdot)$ of the measured CTF can be estimated at two different sub-carrier lags, say p and q. The only requirement is that none of the lags are zero.

The ratio of the squared magnitude of the two covariances is then given by:

$$\xi_{pq} = \frac{|\hat{R}(p)|^2}{|\hat{R}(q)|^2} = \frac{1+(2\pi sq\tau)^2}{1+(2\pi sp\tau)^2} \geq 0 \quad p, q \notin 0 \quad (5)$$

where s denotes the sub-carrier spacing and wherein in the second equality use has been made of the fact that the frequency covariance function and the frequency correlation function (cf. eqn. (3)) per definition only differ in a normalizing constant. The estimated RMS delay spread is then given by:

$$\tau_{pq} = \frac{1}{2\pi s}\sqrt{\frac{\xi_{pq}-1}{q^2 - p^2\xi_{pq}}} \quad (6)$$

where $$\frac{q^2}{p^2} < \xi_{pq} \leq 1 \quad \text{for } p \geq q$$

$$1 < \xi_{pq} < \frac{q^2}{p^2} \quad p < q$$

By inserting the estimated RMS delay spread (eqn. (6)) into eqn. (4) (with $\Delta f=sp$) an estimate of the squared magnitude of the frequency correlation function (i.e. the normalized frequency covariance function) of the noiseless frequency correlation at sub-carrier lag p can be obtained as follows:

$$|R(p)|^2 = \frac{q^2 - p^2\xi_{pq}}{q^2 - p^2} \geq 0 \text{ for } p, q \notin 0 \quad (7)$$

Now, the SNR can be computed. This can be done by estimating the following ratio:

$$\xi_{p0} = \frac{|\hat{R}(p)|^2}{|\hat{R}(0)|^2} = \frac{1}{1+(2\pi\Delta f\tau_{pq})^2}\frac{1}{\left(1+\frac{\sigma_{pq}^2}{P_h}\right)^2} \quad (8)$$

which then can be used to compute the SNR as follows:

$$SNR = \frac{P_h}{\sigma_{pq}^2} = \frac{\sqrt{\xi_{p0}\left(1+\frac{\xi_{pq}-1}{\left(\frac{q}{p}\right)^2-\xi_{pq}}\right)}}{1-\sqrt{\xi_{p0}\left(1+\frac{\xi_{pq}-1}{\left(\frac{q}{p}\right)^2-\xi_{pq}}\right)}} \quad (9)$$

The estimated RMS delay spread or equivalently the frequency correlation function provides a measure of how frequency selective the channel is. The described approach provides a way for estimating the frequency correlation function at lag sp. The sub-carrier lag p should be chosen according to the operating point of interest.

Provided that the exponential PDP assumption is valid, the estimated RMS delay spread can be mapped into a timing estimate based on the location of the first significant tap. First, a naïve timing estimator is estimated, which assumes the PDP to consist of a single tap only. Clearly such a timing estimator would become significantly biased when the time dispersion increases (or coherence bandwidth decreases). The naïve timing estimator amount to computing the angle of the frequency covariance function at a predetermined lag $\Delta f$ (note that in this case the normalizing constant of the covariance is not needed, as only the angle is required), viz.:

$$d_{naive} = -\frac{1}{2\pi\Delta f}\angle\tilde{R}(\Delta f) \quad (10)$$

Figure 1:
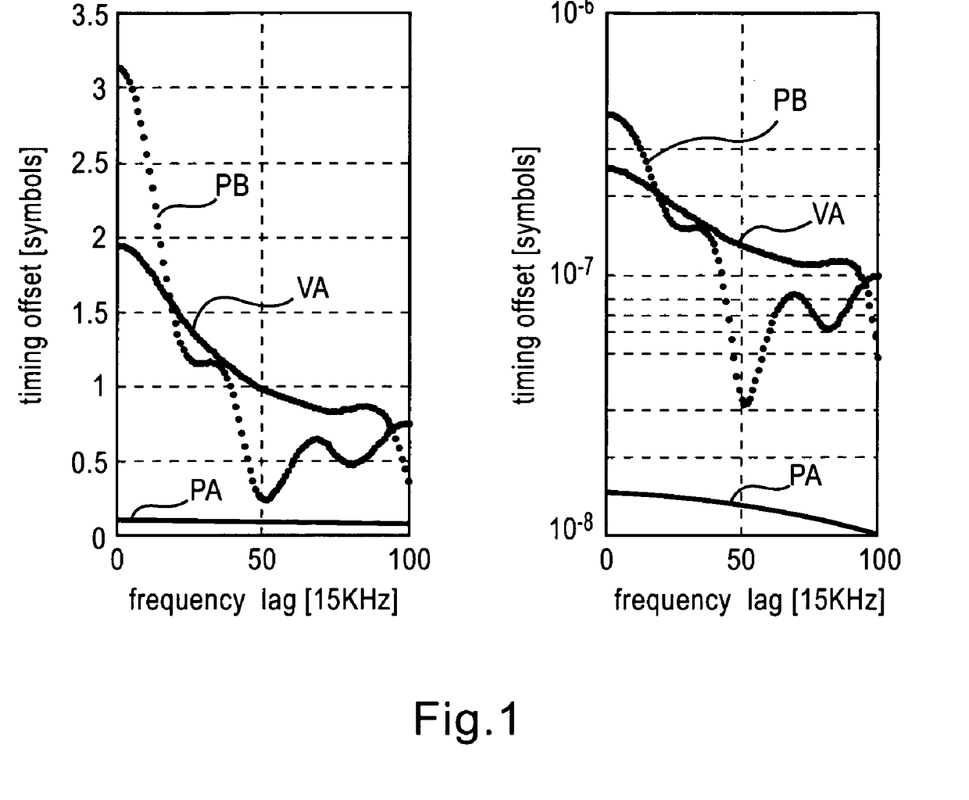
FIG. 1 shows diagrams indicating measured timing offsets estimated by a conventional estimator which does not take into account the time dispersion of the channel.

FIG. 1 shows diagrams indicating the timing offsets estimated by a conventional estimator which does not take into account the time dispersion of the channel. The left panel shows the estimated timing offset in symbols (=samples) as a function of the correlation lag. The right panel shows the estimated timing offset in seconds. The curves show the results for characteristic ITU (International Telecommunication Union) channel profiles PA (Pedestrian A), PB (Pedestrian B) and VA (Vehicular A) according to the "Guidelines for the evaluation of radio transmission technologies for IMT-2000," Recommendation ITU-R M.1225, 1997.

More specifically, FIG. 1 shows the bias of a naïve timing estimator as a function on the evaluation lag. E.g. if the frequency lag is six sub-carriers and the sampling time is 1/(512*15 KHz), then the naïve timing estimator would estimate a delay of approximately 0.125, 3 and 2 symbols for the channel profiles PA, PB and VA, respectively. It is worth noting that average excess delay for these profiles is 14.4 ns (0.1106 symbols), 409.1 ns (3.1419 symbols) and 254.4 ns (1.9538 symbols), respectively. Hence, in this case it seems that the naïve channel estimator "homes in" on the "average" delay of the PDP.

In the embodiment, the timing estimator is based on an exponential PDP. For the exponential PDP the average excess delay is just equal to the RMS delay spread $d_{excess}=\tau_{rms}$ i.e. this is the delay attributed to the time dispersion of the channel. Now, a delay d is introduced which describes the time to the first path. The frequency correlation function is then given by:

$$R(\Delta f) = \frac{1-j2\pi\Delta f\tau_{rms}}{1+(2\pi\Delta f\tau_{rms})^2}e^{-j2\pi\Delta f d}$$

(11)
which indicates that the phase angle of the frequency correlation function is the sum of a part originating from the time-dispersion of the channel and a part originating from the delay to the first path.

Figure 2:
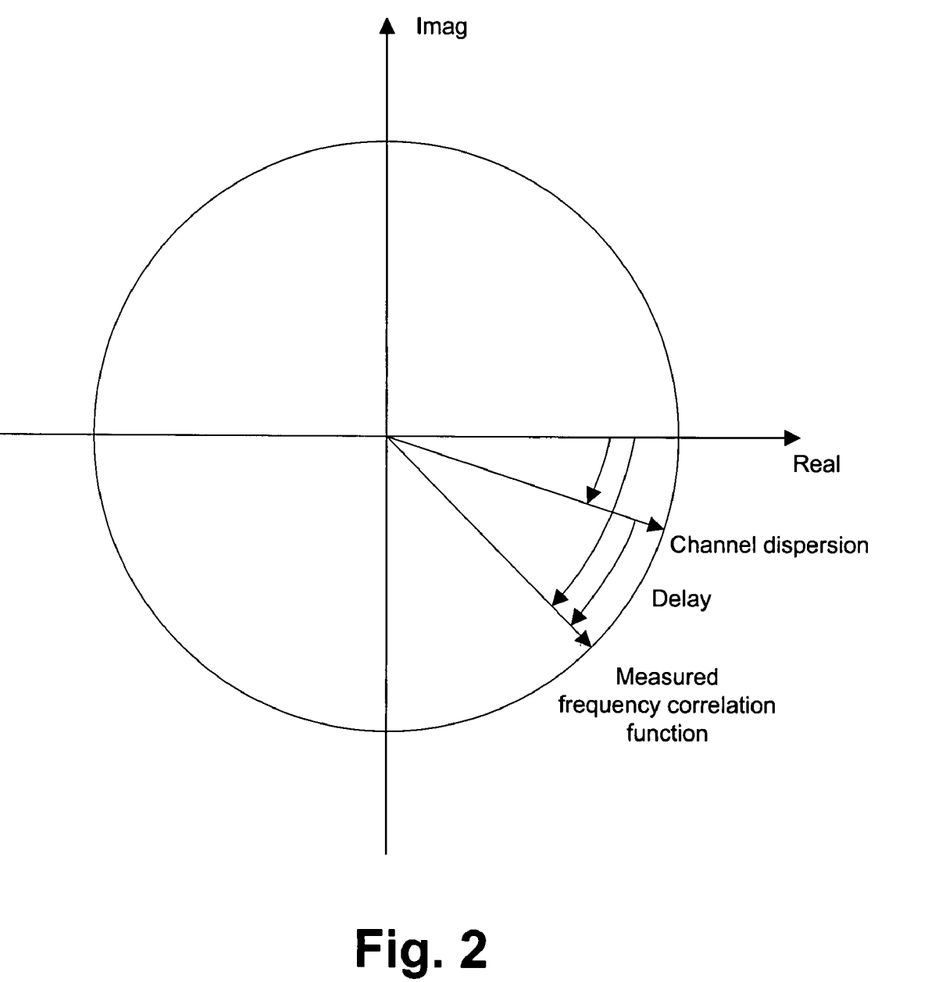
FIG. 2 shows a complex vector diagram illustrating a composition of a frequency correlation function of a part attributed to channel time-dispersion and a part attributed to first path delay.

FIG. 2 shows a complex vector diagram illustrating the above composition of the measured frequency correlation function as a first part attributed to channel time-dispersion and a second part attributed to (first path) delay. The delay can be estimated by phase subtracting the channel dispersion part from the measured frequency correlation function.

Since the squared magnitude of the frequency correlation function is invariant of the delay d, the RMS delay spread $\tau_{rms}$ simply can be calculated as described previously. Once the RMS delay spread is estimated it is possible to compute the phase angle of the frequency correlation function which is attributed to the time dispersion, i.e.

$$d_{excess}=\angle(1-j2\pi\Delta f\tau_{rms}) \quad (12)$$

Now, the phase angle of the frequency correlation function evaluated at lag $\Delta f$ can be evaluated and the phase angle attributed to the channel can be subtracted in order to obtain the phase angle attributed to the delay which in turn is mapped into an estimate of the delay.

To summarize, a method for estimating the coherence bandwidth and noise level based on estimates of the frequency covariance function have been described so far. Also, a method for estimating the time (delay) to the first path has been described. The performance of the proposed methods depends on the quality of the estimated frequency covariance function $R(\bullet)$. In order to improve the equality of the estimated frequency covariance function, measures such as averaging/filtering the statistics over an extended period of time can be adopted.

Figure 3:
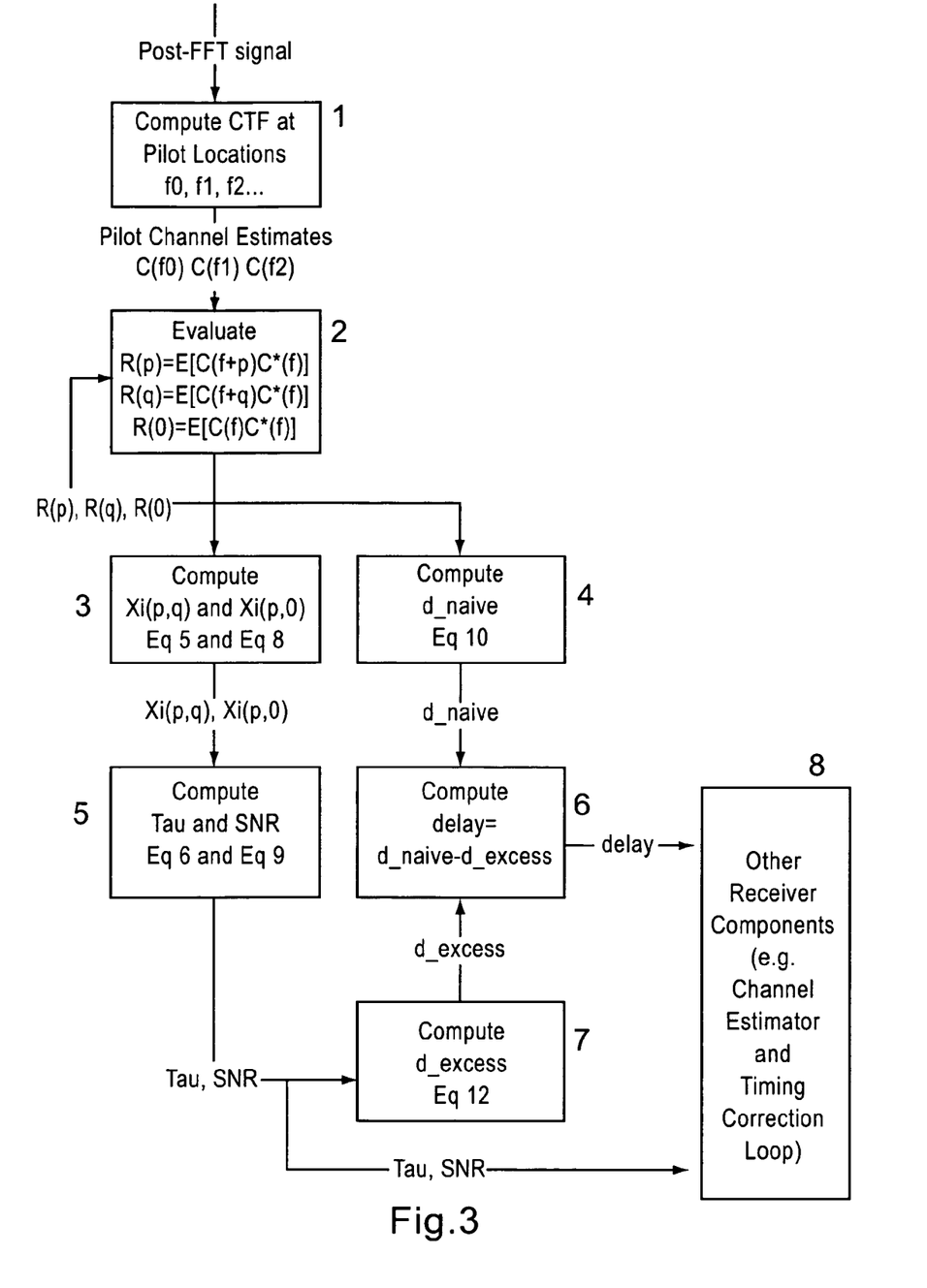
FIG. 3 shows a schematic block diagram of an estimator according to the preferred embodiment.

FIG. 3 shows an example of an implementation according to an embodiment based on a modular structure in a receiver, transceiver or modem device of a terminal or network device, which may reflect functional components of a processing flow or software routine. Or, alternatively, the modules of the modular structure of FIG. 3 may reflect concrete hardware circuits for effecting the underlying functionalities.

In a first module 1 the channel transfer function is sampled (e.g. by a least-squares channel estimation) at the pilot locations using knowledge of the transmitted constellation points. In a second module 2 the co-variances (frequency correlations) are estimated based on the pilot channel estimates. In order to improve the quality of the estimated frequency correlations previous estimates of the frequency correlations could be included (e.g. by averaging or filtering the frequency correlation estimates (or frequency covariance estimates). In FIG. 3, this is illustrated as a feed-back connection back to the second module 2. In a third module 3 ratios of the squared magnitude of the correlations estimates is computed (cf. equations (5) and (8)). These are then used to compute the coherence bandwidth or RMS delay-spread $\tau_{rms}$ ("Tau" in FIG. 3) and signal-to-noise ratio SNR in a fifth module 5 (cf. equations (6) and (9)). In a fourth module 4 the naïve timing estimate $d_{naive}$ is computed (cf. equation (10)) using the assumption $\Delta f = sp$.

A seventh module 7 computes the excess delay $d_{excess}$ (cf. equation (12)) at $\Delta f = sp$ using the estimated RMS delay-spread $\tau_{rms}$. A sixth module 6 estimates the delay to the first significant path by computing the difference $d_{naive} - d_{excess}$. The estimated RMS delay spread (coherence bandwidth), signal-to-noise ratio and delay to the first significant path is then passed on to an eighth module 8 where they are used by other receiver components, e.g. channel estimator, timing correction loop etc. Also this information could (in some format) be transmitted back to a scheduler functionality, such as a base station or access-point radio resource scheduler.

Figure 4:
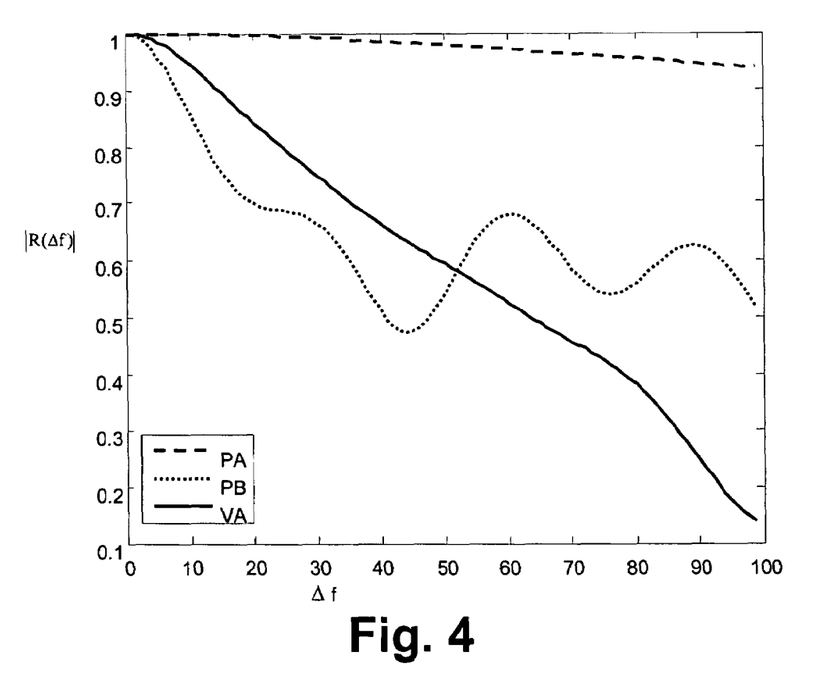
FIG. 4 shows a diagram indicating a frequency correlation function for different channels.

FIG. 4 illustrates the above frequency correlation function (cf. equation (12)) for the different ITU channel profiles PA, PB and VA. Hence, in order to apply the proposed estimator or estimation method to discriminate between these channels with sufficient accuracy the frequency lag sp should not be chosen to small. As an example a more sensible choice would be to choose sp to be approximately 20*15 kHz. The auxiliary frequency lag sq should be chosen as small as possible in order to maximize the range of the estimator (see eqn. (6)).

Figure 5:
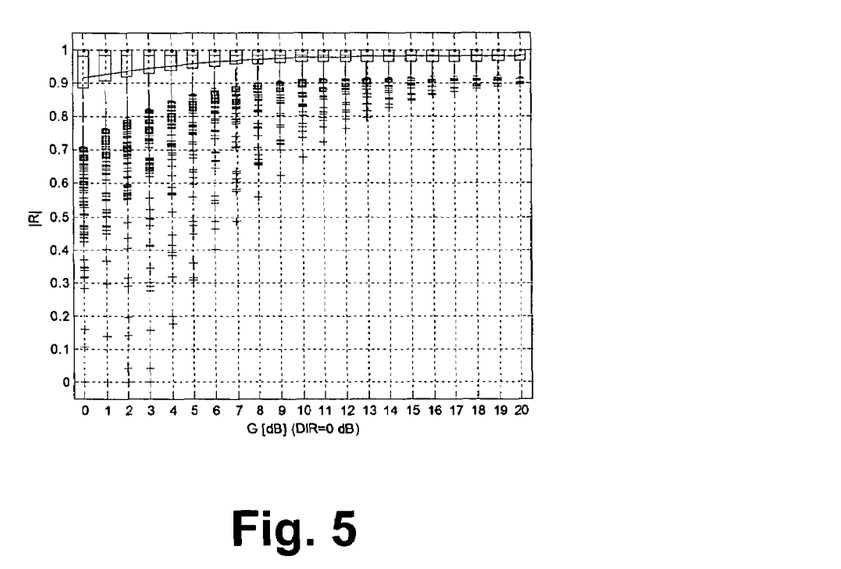
FIGS. 5 to 8 show diagrams indicating distributions of coherence bandwidth and noise level estimates for different simulations.
Figure 6:
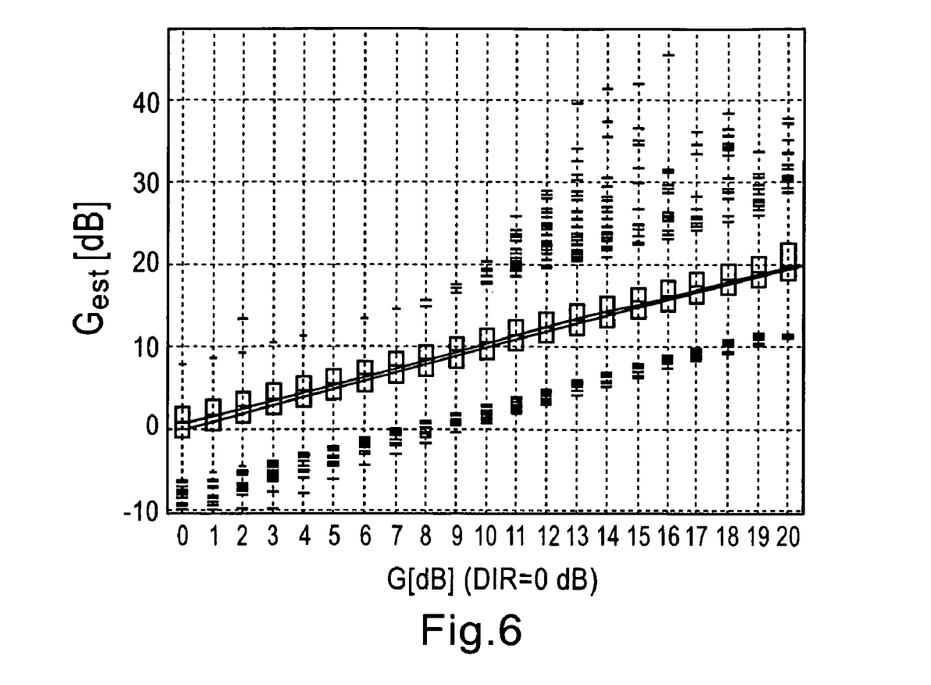
Figure 7:
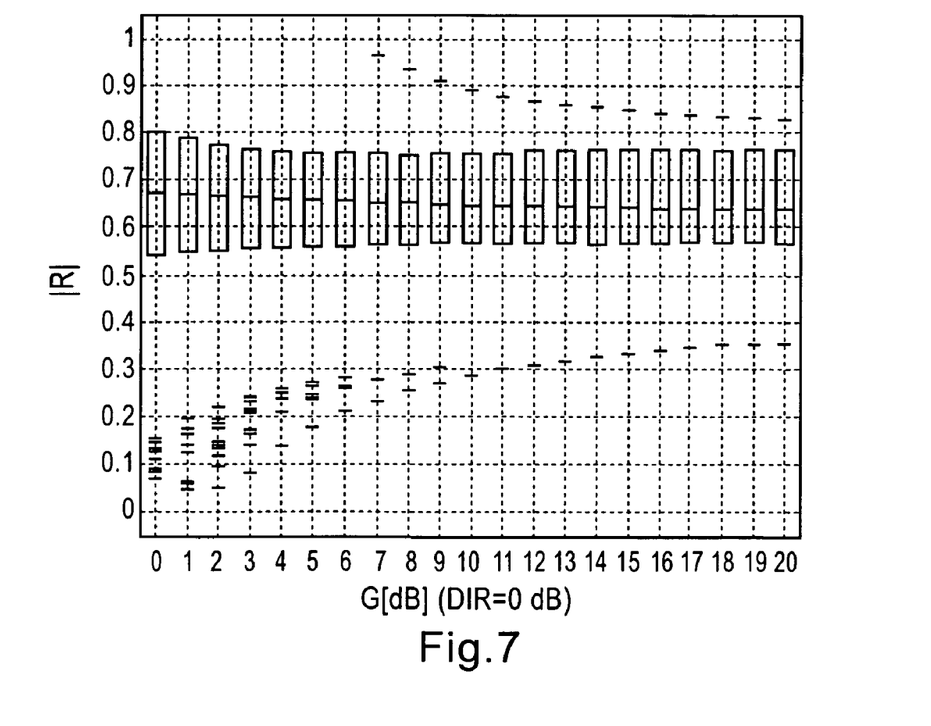
Figure 8:
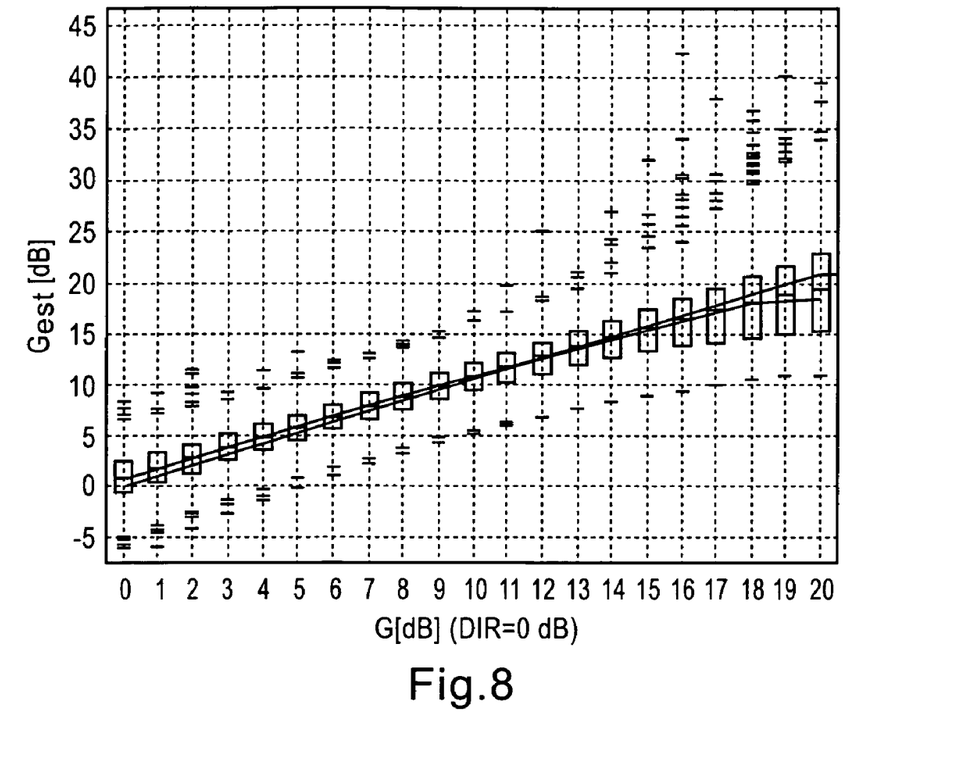

FIGS. 5 to 8 show diagrams indicating distributions of coherence bandwidth and noise level estimates for different simulations. In the simulations, p=5 and q=1 have been used. The simulations are based on 1000 OFDM symbols (5 MHz bandwidth) using pilot spacing 6 and DIR=0 dB. The sub-carrier separation is 15 kHz. Hence, the correlation at sub-carrier lag 5*6=30 is estimated. The diagrams of FIGS. 5 and 6 show the magnitude of the estimated frequency correlation function (FIG. 5) and the estimated G value (FIG. 6) for a PA3 channel profile. The diagrams of FIGS. 7 and 8 show the same things for a PB3 channel profile. The covariance function is evaluated based on the pilots within one OFDM symbol only. The boxes have lines at the lower quartile, median, and upper quartile values. The whiskers are lines extending from each end of the boxes to show the extent of the rest of the estimates. Outliers are estimates with values beyond the ends of the whiskers. The panels also show the ideal and average estimate (solid lines in the middle portion).

Compared to the correct frequency correlation function for the PA and PB channel profiles of FIG. 4, it can be gathered that the average correlation estimate agrees well with the correct frequency correlation at sub-carrier lag 30. This illustrates that it is indeed possible to estimate the frequency correlation even though the true PDP is not precisely exponential.

Figure 9:
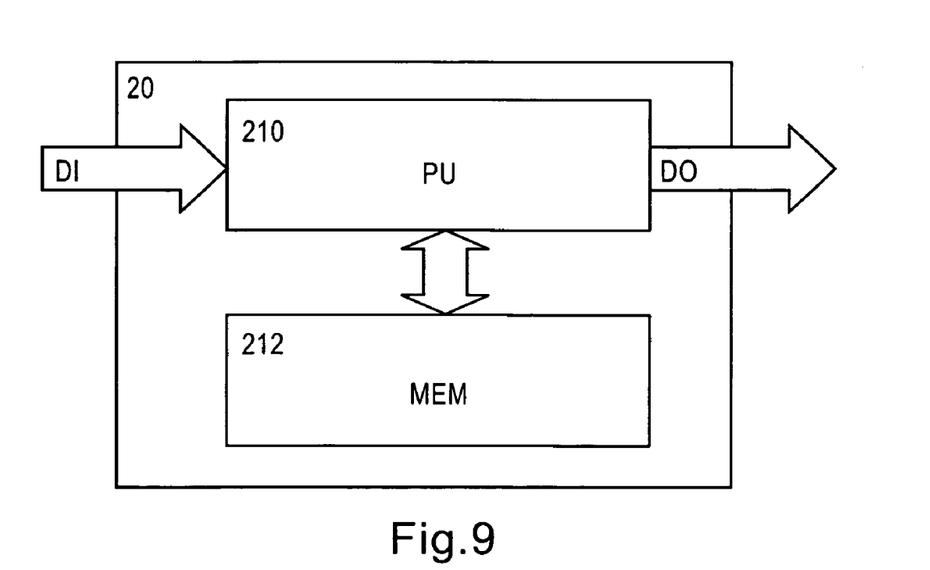
FIG. 9 shows a schematic block diagram of a software-based implementation according to an embodiment.

FIG. 9 shows a schematic block diagram of an alternative software-based embodiment of the proposed functionalities for achieving coherence bandwidth and noise variance estimation. The required functionalities can be implemented in a receiver, estimation, or modem module 20 with a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described in the block diagram of FIG. 3. These processing steps may be performed on the basis of input data DI and may generate output data DO, wherein the input data DI may correspond to a post Fast Fourier transformation (FFT) signal obtained from an FFT stage or routine, and the output data DO may correspond to the estimated coherence bandwidth, delay or SNR.

In summary, a method, apparatus, and computer program product have been described, wherein frequency co-variances or correlations of a measured power delay profile or frequency correlation function are estimated at two different non-zero sub-carrier lags of an orthogonal frequency division multiplexing channel. A ratio of magnitudes of the two estimated frequency co-variances is calculated and a delay spread or coherence bandwidth of said channel is estimated based on the calculated ratio.

It is noted that the present invention can be implemented or used in any transmission system where a channel estimation is performed. More specifically, the present invention can be applied in radio systems like e.g. WiMAX (Worldwide Interoperability for Microwave Access) as currently standardized in 3GPP for WCDMA (Wideband Code Division Multiple Access), as well as 3GPP E-UTRAN (Enhanced Universal Mobile Telecommunications System (UMTS) Terrestrial Radio Access Network), such as LTE (Long Term Evolution) or 3.9G. These radio access technologies (e.g. WLAN, WiMAX, E-UTRAN or 3G LTE) may involve multiple-input multiple-output (MIMO) systems or multi-beam/multi-antenna transmitter or receiver devices (e.g. base station devices, access points or other access devices) capable of receiving signals via different receiving paths and/or channels. The proposed coherence bandwidth and signal-to-noise level estimator may be implemented in a receiver apparatus, a receiver module, a chip set of a receiver, or as a part of a channel estimator sub-system. The estimates obtained in the above embodiments can be used as descriptors of a (radio) link-quality and could be transmitted (in some form) back to the radio-resource scheduler. The present invention is thus not restricted to the above predetermined embodiments which may vary within the scope of the attached claims.

The invention claimed is:

1. A method, comprising:
   estimating frequency co-variances or correlations of a measured power delay profile or frequency correlation function at two different non-zero sub-carrier lags of an orthogonal frequency division multiplexing channel;
   calculating a function of a ratio of magnitudes of the two estimated frequency co-variances; and
   estimating a delay spread or coherence bandwidth of said channel based on said calculated function.

2. The method according to claim 1, further comprising:
   using said estimated delay spread or coherence bandwidth to estimate the magnitude of a noiseless frequency correlation at one of said two different sub-carrier lags.

3. The method according to claim 2, further comprising:
   determining a signal-to-noise ratio by estimating a ratio between said magnitude of said noiseless frequency correlation at said one of said two different subcarrier lags and an estimated magnitude of said noiseless frequency correlation at a sub-carrier lag of zero.

4. The method according to claim 1, wherein one of said two subcarrier lags is selected according to an operating point of interest.

5. The method according to claim 1, further comprising:
   mapping said estimated delay spread or coherence bandwidth into a timing estimate based on the location of a first significant tap.

6. The method according to claim 1, further comprising:
   estimating a phase angle of said frequency correlation function and subtracting a phase angle part originating from a time dispersion of said channel in order to obtain a phase angle which is mapped into an estimate of a delay which describes a time to a first path of said channel.

7. The method according to claim 6, wherein said phase angle of said frequency correlation function is obtained from a naïve timing estimation.

8. The method according to claim 1, wherein said frequency correlations or co-variances are estimated based on pilot channel estimates.

9. The method according to claim 1, wherein said frequency correlations or co-variances are estimated based in parts on at least one previous frequency correlation or co-variance estimate.

10. An apparatus, comprising:
    at least one processor; and
    at least one memory including computer program code,
    the at least one memory and the computer program code configured, with the at least one processor, to cause the apparatus at least to
    estimate frequency co-variances or correlations of a measured power delay profile or frequency correlation function at two different non-zero sub-carrier lags of an orthogonal frequency division multiplexing channel;
    calculate a function of the ratio of squared magnitudes of the two estimated frequency co-variances; and
    estimate a delay spread or coherence bandwidth of said channel based on said calculated function.

11. The apparatus according to claim 10, wherein the at least one memory and the computer program code are further configured, with the at least one processor, to cause the apparatus at least to
    use said estimated delay spread or coherence bandwidth to estimate the magnitude of a noiseless frequency correlation at one of said two different non-zero sub-carrier lags.

12. The apparatus according to claim 11, wherein the at least one memory and the computer program code are further configured, with the at least one processor, to cause the apparatus at least to:
    determine a signal-to-noise ratio by estimating a ratio between said magnitude of said noiseless frequency correlation at said one of said two different subcarrier lags and an estimated magnitude of said noiseless frequency correlation at zero sub-carrier lag.

13. The apparatus according to claim 10, wherein one of said two non-zero sub-carrier lags is selected according to an operating point of interest.

14. The apparatus according to claim 10, wherein the at least one memory and the computer program code are further configured, with the at least one processor, to cause the apparatus at least to:
    map said estimated delay spread or coherence bandwidth into a timing estimate based on the location of a first significant tap.

15. The apparatus according to claim 10, wherein the at least one memory and the computer program code are further configured, with the at least one processor, to cause the apparatus at least to:
    estimate a phase angle of said frequency correlation function, for subtracting a phase angle part originating from a time dispersion of said channel in order to obtain a corrected phase angle, and for mapping said corrected phase angle into an estimate of a delay which describes a time to a first path of said channel.

16. The apparatus according to claim 15, wherein the at least one memory and the computer program code are further configured, with the at least one processor, to cause the apparatus at least to estimate said phase angle of said frequency correlation function by applying a naïve timing estimation.

17. The apparatus according to claim 10, wherein the at least one memory and the computer program code are further configured, with the at least one processor, to cause the apparatus at least to estimate said frequency correlations or co-variances based on pilot channel estimates.

18. The apparatus according to claim 10, wherein the at least one memory and the computer program code are further configured, with the at least one processor, to cause the apparatus at least to estimate said frequency correlations or co-variances based in parts on at least one previous frequency correlation or co-variance estimate.

19. An apparatus, comprising:
    first estimation means for estimating frequency co-variances or correlations of a measured power delay profile or frequency correlation function at two different non-zero sub-carrier lags of an orthogonal frequency division multiplexing channel;
    calculation means for calculating a function of a ratio of magnitudes of the two estimated frequency co-variances; and
    second estimation means for estimating a delay spread or coherence bandwidth of said channel based on said calculated function.

20. A receiver module, comprising:
    at least one processor; and
    at least one memory including computer program code,
    the at least one memory and the computer program code configured, with the at least one processor, to cause the apparatus at least to estimate frequency co-variances or correlations of a measured power delay profile or frequency correlation function at two different non-zero sub-carrier lags of an orthogonal frequency division multiplexing channel;

calculate a function of a ratio of magnitudes of the two estimated frequency co-variances; and estimate a delay spread or coherence bandwidth of said channel based on said calculated function.

21. A chip device, comprising a receiver module according to claim 20.

22. A computer program embodied on a non-transitory computer readable medium, the computer program being configured to control a processor to perform:

estimating frequency co-variances or correlations of a measured power delay profile or frequency correlation function at two different non-zero sub-carrier lags of an orthogonal frequency division multiplexing channel;

calculating a function of a ratio of magnitudes of the two estimated frequency co-variances; and estimating a delay spread or coherence bandwidth of said channel based on said calculated function.

23. A terminal device comprising a receiver module according to claim 20 and a detection unit configured to detect a value of a signal received via said channel.

* * * * *